United States Patent [19]

Feller

[11] 4,164,864
[45] Aug. 21, 1979

[54] METHOD AND APPARATUS FOR SUPPORTING A SENSOR IN A NORMALLY INACESSIBLE AREA OF A MACHINE

[75] Inventor: Thomas R. Feller, Milwaukee, Wis.

[73] Assignee: Allis-Chalmers Corporation, Milwaukee, Wis.

[21] Appl. No.: 929,649

[22] Filed: Jul. 31, 1978

[51] Int. Cl.² .......................................... G01M 13/00
[52] U.S. Cl. ...................................... 73/118; 324/207
[58] Field of Search ............ 73/140, 118; 33/DIG. 5; 340/682, 686; 324/207, 208, 262

[56] References Cited

U.S. PATENT DOCUMENTS

| 2,921,298 | 1/1960 | Jackson | 324/207 X |
| 3,539,912 | 11/1970 | Wardle | 324/207 |
| 4,066,949 | 1/1978 | Condrac | 324/207 X |

Primary Examiner—Jerry W. Myracle
Attorney, Agent, or Firm—Robert C. Jones

[57] ABSTRACT

A noncontacting axial position monitor or probe is carried on an extending rod which reaches into a normally inaccessible area and there is provided adjusting means operable to effect an internal position adjustment of the probe externally of the device being monitored.

8 Claims, 2 Drawing Figures

METHOD AND APPARATUS FOR SUPPORTING A SENSOR IN A NORMALLY INACESSIBLE AREA OF A MACHINE

BACKGROUND

In most of todays modern high speed machines such as compressors, turbines, high speed gears, etc. the axial displacement of the rotating element is highly critical.

Axial displacement of a shaft, for example in a chlorine or Freon compressor which is part of a critical process can indicate a malfunction is occurring either in the process or in the compressor or a related component (gear, turbine, motor).

Some examples of causes that can have an effect on thrust loading or shaft axial shift are: slugs of liquid suddenly sucked into a Freon or chlorine compressor, change of oil supply to the thrust bearing, thermal changes in either the rotating element or the housing of a unit (compressor, turbines, pump, gear, etc.), fluid seal failure changing loading conditions on the rotating element or external thrust transmitted through couplings from driving or driven related machines. Thus, in critical systems indications of a malfunction can be used to sound alarms or even shut the system down before serious damage to the system occurs. To sense shaft displacement, probe type sensors that translate the distance gap to voltage have been used in the past. However, the use of sensors for axial float have always been utilized by insertion of the probe into sensing relationship with the shaft through the back plate of the compressor bearing housing or set into a fixed wall inside the bearing housing. But, because of the development and use of thru drive machines, or if coupling guards or for many other reasons the area of the backplate is not usable for sensor installation, a mounting arrangement for the internal location of the sensor is required. Placement of the sensor within the machine has been accomplished but the arrangement required that the upper half of the bearing housing had to be disassembled at any time adjustment to the sensor had to be made or the sensor replaced.

SUMMARY OF THE INVENTION

In accordance with the preferred embodiment of the present invention, there is provided a probe or sensor mounting apparatus and method therefor which includes a rod or arm that reaches into a normally inaccesible area of a bearing housing. Adjusting means are incorporated into the mounting arrangement to provide for fine adjustments in the position of the sensor or probe. The mounting arrangement provides for adjustability as well as rigidity of the probe, simplifies maintenance and allows quick changeover of the probe without the necessity of shutting down the unit.

It is a general object of the present invention to provide a rigid and adjustable probe mount for supporting the probe internally of a machine, in addition to providing an exposion proof closure.

Yet another object of the present invention is to provide a remote probe mounting arrangement which is capable of reaching into a normally inaccessible area of a machine and one that is also adjustable.

Still another object of the present invention is to provide a probe mounting arrangement which is removable for probe replacement without shutting down the machine.

DESCRIPTION OF THE INVENTION

Figure 1:
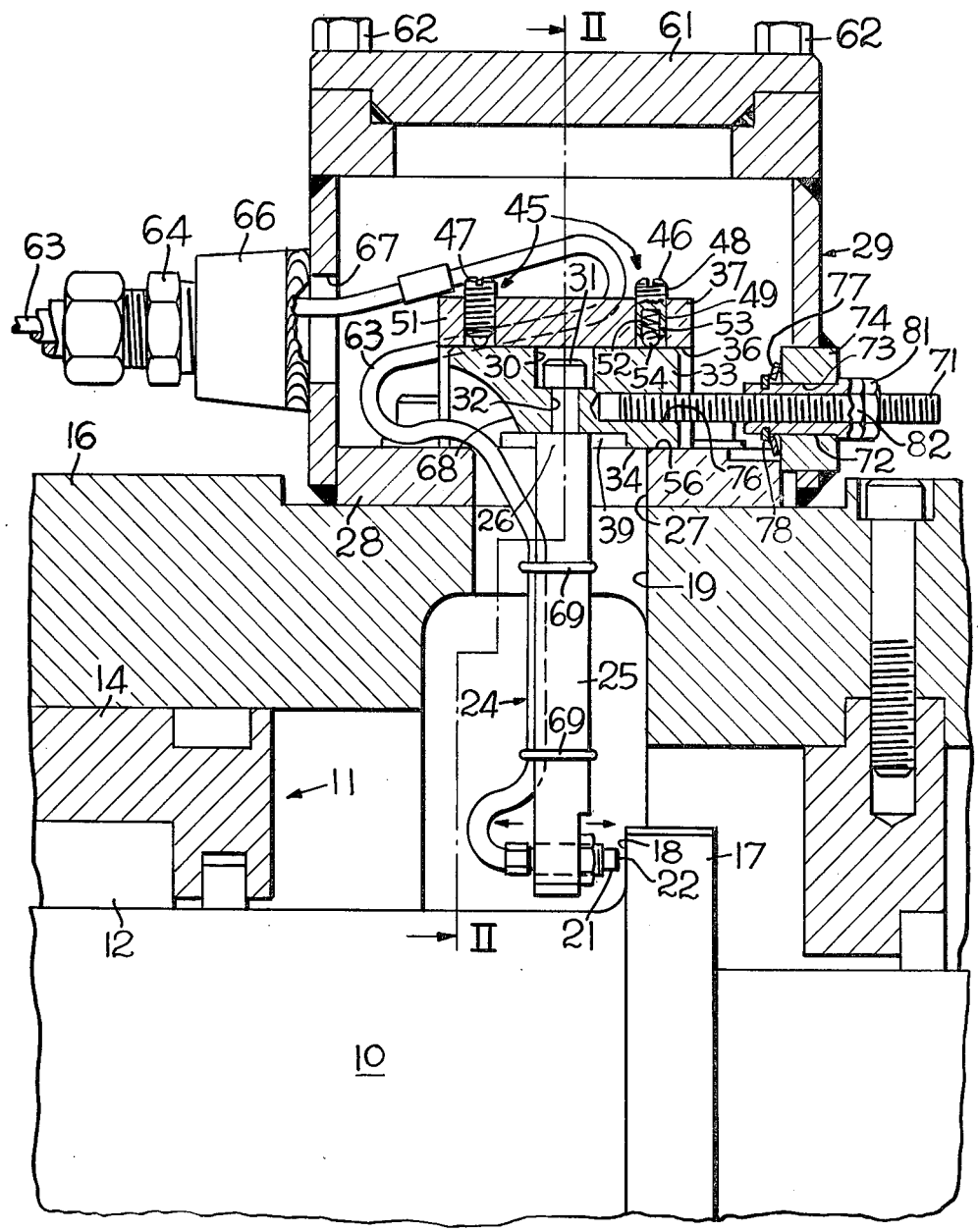
FIG. 1 is an enlarged fragmentary sectional view through a bearing housing and showing the novel probe mounting arrangement of the present invention; and, FIG. 2 is a view taken in a plane represented by the line II—II in FIG. 1.

As shown in the drawing a shaft such as a compressor shaft 10 is rotatably supported by a bearing assembly 11 including a bearing 12 confined within a bearing cartridge 14. The bearing assembly 11 is disposed within a bearing housing 16 of a compressor with which the shaft 10 is associated. The shaft 10 is provided with a radial flange 17 the face 18 of which in the present instance is usable as an axial surface for sensing axial float or displacement of the shaft 10 within the housing 16.

Figure 2:
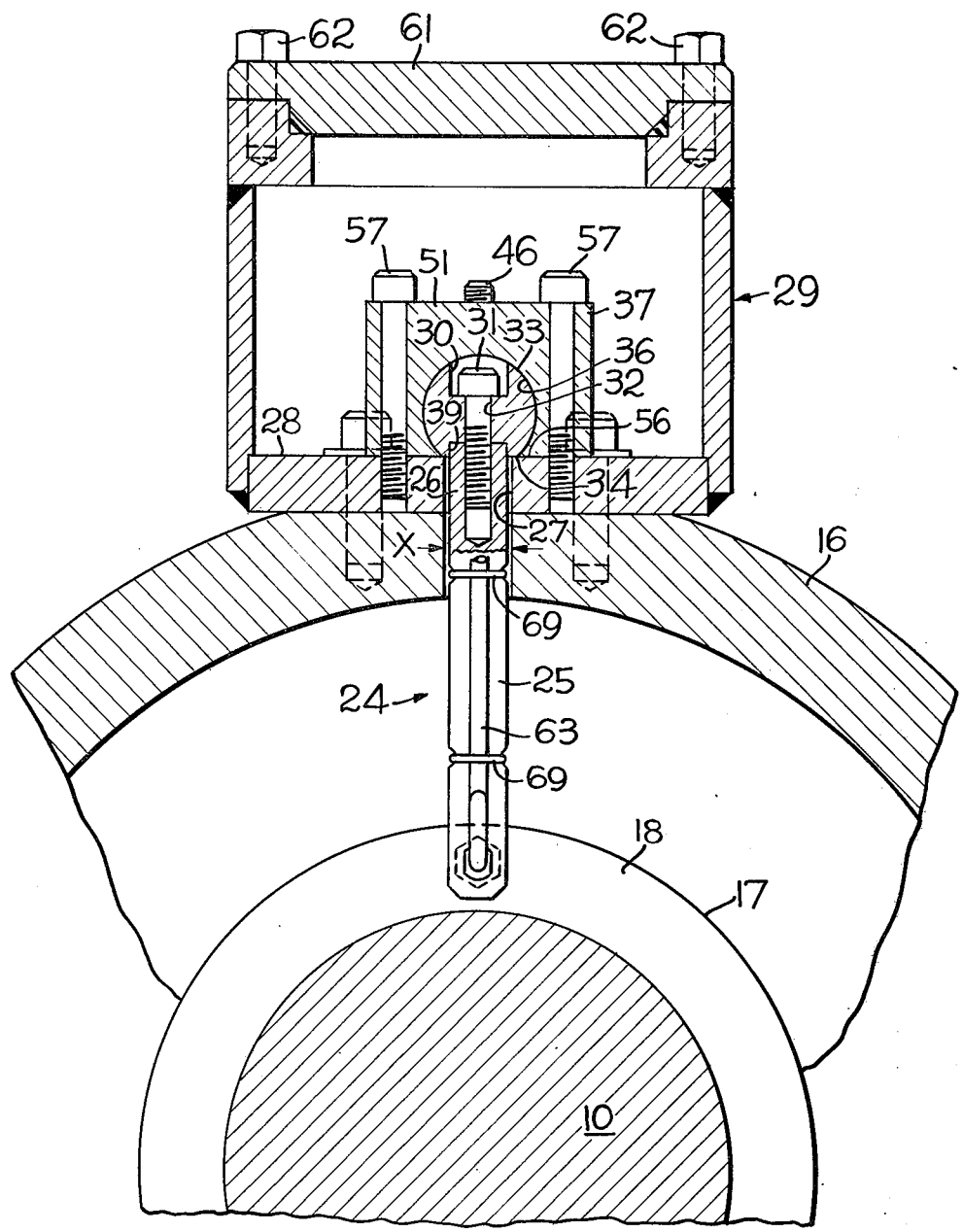

The bearing housing 16 is provided with a radial opening 19 which provides an access passageway into the housing in an area adjacent the radial flange 17 for a probe or sensor 21. The probe end or sensing face 22 is positioned to within 0.050 of an inch of the surface 18 the axial position of which it is desired to monitor. To enable the sensor or probe 21 to be suspended in the aperature and to be positioned within the interior of the bearing housing 16, there is provided a probe holder 24. As herein shown the probe holder 24 is in the form of an elongated square rod 25 which has its upper end 26 confined with an elongated slot 27 formed in a floor or bottom plate 28 of a sealed housing 29. The narrow dimension X, FIG. 2, is formed just sufficiently large to allow the rod 25 to pass through the slot into the interior of the bearing housing and still provide lateral support to prevent the rod 25 from deflecting laterally any appreciable amount from the perpendicular. At its upper end the rod 25 threadedly receives a socket cap screw 31 the shank of which passes through an opening 32 formed in a slider 33. A recess 30 formed in the slider 33 receives the head of the cap screw 31.

As shown, the slider 33 is an elongated cylindrical bar having the bottom portion machined so as to form a smooth flat surface 34. The slider 33 is disposed within a bored opening 36 formed in a guide block 37. The fit of the slider 33 within the bore 36 is such as to permit axial movement of the slider but prevents the slider from moving laterally. To prevent the rod 25 from rotating relative to the slider 33 the head or upper end 26 of the square rod 25 slip fits within an elongated recess 39 milled in the bottom surface 34 of the slider 33. The elongated recess 39 is formed so that its major or longitudinal axis is parallel to the longitudinal axis of the slider 33. Thus, the rod 25 prevents the slider 33 from rotating within the bore 36 of the guide block 37 while the rod 25 is prevented from moving laterally by the close fit of the side walls of the slot 27 as defined by the dimension X.

To hold the slider 33 in sliding engagement with the milled upper surface of the housing bottom plate 28 there is provided yieldable hold down means 45. The hold down means 45 are a pair of spring plungers 46 and 47 which are identical. As shown, in FIG. 1, the spring plunger 46 comprises a threaded screw 48 which is threadedly engaged in a threaded opening 49 formed in the top portion 51 of the guide block 37. A spring 52 confined within an axial blind bore 53 formed in screw 48 acts on a plunger 54. Thus, the slider 33 is yieldably urged and maintained in sliding engagement with the surface 56 of the bottom plate 28. From the foregoing it is apparent that the sensor or probe 21 is rigidly held in an operative position so that inadvertent displacement of the sensor face 22 with respect to the surface 18 cannot occur.

As shown, the guide block 37 is firmly held in its operative position by means of a plurality of socket head cap screws 57. The entire guide block 37 is disposed within the sealed housing 29 which is provided with an access cover 61. The access cover is secured in position by means of screws 62.

To provide access for a cable 63 from an external monitor (not shown), which is a signal conditioning device available commercially, to the sensor 22 there is provided an entrance bushing 64 which is adapted to threadedly engage in a fitting 66 welded to the external surface of the side wall of the housing 29. The fitting 66 conforms to an opening 67 formed in the housing wall and through which the cable 63 passes. The bushing 64 provides a seal for the cable 63. To enable the cable to pass downwardly through the slot 27 and the opening 19 to connect with the sensor 21, the slider 33 is formed with an arcuate slot 68 which may conveniently be formed with a milling cutter. This, axial movement of the slider 33 within the bore 36 of the guide block 37 will not pinch or cut the cable 36. Cable 36 is secured to rod 25 by means of rubber "O" rings 69 snapped into grooves in rod 25.

To effect the exact positioning of the sensor face 22 with respect to the face 18 of the flange 17, the slider 33 is axially adjustable. To this end a threaded stud 71, FIG. 1 is threadedly engaged in a threaded bushing 72 which is disposed within an opening 73 formed in boss 74 in the housing side wall. The stud 71 extends inwardly into the housing 29 and is threadedly engaged in a threaded blind bore 76 formed in the axial end face of the slider 33. On the inner end of the bushing 72 a belleview type washer 77 is mounted and is locked thereon in abutting engagement with the inner axial end face of the boss 74 by means of a snap ring 78. Axial position movement of the slider 33 to effect a desired positioning of the sensing face 22 with respect to the surface 18 of the flange is easily accomplished by rotation of the bushing 72. Upon attaining the desired spacing between the face 22 of the sensor and the face 18 of the flange 17 a lock nut 81 is rotated into engagement with the nut-head 82 of the bushing 72 thereby locking the slider 33 in the adjusted position. With the adjusting arrangement described fine adjustment in the position of the sensor face 22 can be accomplished while the compressor is operating so that the most sensitive response can be obtained from the sensor 21 to indicate compressor shaft float.

The embodiments of the invention in which an exclusive property or privilege is claimed are defined as follows:

1. In a method of supporting a sensor within a normally inaccessible area of an operative machine to pick-up the axial float of a rotating shaft, the axial end face of which cannot be sensed, comprising the steps of:
    suspending the sensor on the end of a support;
    inserting the support into the normally inaccessible area of the machine without displacing portions of the machine in position to locate the sensor adjacent to a portion of the shaft other than the axial end face thereof adaptable to continuous axial position monitoring;
    providing adjusting means external of the machine for adjusting the position of the sensor with respect to the shaft portion which it is monitoring.

2. The method according to claim 1 including the step of:
    mounting the support in a positionable member of the machine on the external surface;
    applying the adjusting means to the positioning member.

3. In a method of supporting a sensor within a normally inaccessible area of a machine to pick-up the float of a rotating shaft thereof, said shaft having axial end faces which are not accessible, comprising the steps of:
    suspending the sensor on the end of a support;
    inserting the support into the normally inaccessible area of the machine in position to locate the sensor adjacent to a portion of the machine shaft adaptable to continuous axial position monitoring;
    providing a holding means for the support located on the external surface of the machine for holding the support rigid to prevent its movement in three mutually transverse planes;
    providing adjusting means external of the machine for adjusting the position of the holding means of the support to effect an adjustment in the position of the sensor with respect to the portion of the machine shaft being monitored.

4. In a support for holding a sensor in a normally inaccessible area of an operating machine having a frame and a rotatable shaft to enable the sensor to pick-up the axial float of the rotating shaft of the machine, the axial end faces of which are not accessible;
    an opening in the machine frame to provide access to the normally inaccessible area of the machine;
    an arm extending through the access opening of the machine frame into the normally inaccessible area of the machine, said arm being provided with the sensor;
    support means on the external surface of the machine frame connected to rigidly carry said arm to prevent its movement in three mutually transverse planes; and,
    adjusting means externally of the machine operably connected to effect a movement of said support means for positioning the sensor carried by said arm in a desired position within the inaccessible area of the machine without the necessity of stopping the operation of the machine.

5. A support according to claim 4 wherein said support means includes a guide block secured to the external surface of the machine frame over said access opening into the normally inaccessible area of the machine, said guide block having a guideway therein;
    a slider disposed for movement in said guideblock across said access opening; and,
    securing means for securing said arm to said slider.

6. A support according to claim 5 wherein said adjusting means is connected to move said slider across said access opening and parallel to the axis of the shaft for effecting a positioning of the sensor.

7. A support according to claim 6 wherein there is provided a housing secured to the external surface of the machine frame and operable to provide a sealed enclosure around said guide block and the access opening in the machine frame to prevent contamination of the normally inaccessible area of the machine.

8. A support according to claim 7 wherein said adjusting means is carried in the wall of the housing and is operably connected to move said slider without the necessity of removing cover 61.

* * * * *